(12) United States Patent
Zhang

(10) Patent No.: US 9,167,561 B2
(45) Date of Patent: Oct. 20, 2015

(54) SEQUENCE INITIALIZATION FOR DEMODULATION REFERENCE SIGNAL

(71) Applicant: ZTE (USA) Inc., Richardson, TX (US)

(72) Inventor: Wenfeng Zhang, Plano, TX (US)

(73) Assignee: ZTE (USA) Inc., Richardson, TX (US)

( * ) Notice: Subject to any disclaimer, the term of this patent is extended or adjusted under 35 U.S.C. 154(b) by 321 days.

(21) Appl. No.: 13/791,767

(22) Filed: Mar. 8, 2013

(65) Prior Publication Data

US 2013/0235819 A1   Sep. 12, 2013

Related U.S. Application Data

(60) Provisional application No. 61/609,831, filed on Mar. 12, 2012, provisional application No. 61/622,418, filed on Apr. 10, 2012.

(51) Int. Cl.
| | |
|---|---|
| *H04W 24/02* | (2009.01) |
| *H04W 56/00* | (2009.01) |
| *H04W 72/04* | (2009.01) |
| *H04L 5/00* | (2006.01) |
| *H04W 88/02* | (2009.01) |
| *H04W 88/08* | (2009.01) |
| *H04W 28/18* | (2009.01) |

(52) U.S. Cl.
CPC .............. *H04W 72/04* (2013.01); *H04L 5/005* (2013.01); *H04W 28/18* (2013.01)

(58) Field of Classification Search
USPC ........................................ 370/252, 329, 430
See application file for complete search history.

(56) References Cited

U.S. PATENT DOCUMENTS

| | | | | |
|---|---|---|---|---|
| 2011/0206087 A1* | 8/2011 | Picard | ............................ | 375/132 |
| 2013/0286812 A1* | 10/2013 | Lee et al. | ...................... | 370/208 |
| 2015/0016396 A1* | 1/2015 | Gaal et al. | ...................... | 370/329 |

* cited by examiner

*Primary Examiner* — John Pezzlo
(74) *Attorney, Agent, or Firm* — Morgan, Lewis & Bockius LLP

(57) ABSTRACT

A new sequence initialization for demodulation reference signal (DMRS) sequence design used in the LTE-A system is provided. In some implementations, the modulo-2 addition of $n_{SCID}$ and $n_{NDI}$, both of which are provided in a downlink control information (DCI) message, is used to dynamically select one of a plurality of parameter candidates and the dynamically selected parameter is then used for determining the initialization state of a DMRS sequence. In some other implementations, the modulo-2 addition of $n_{SCID}$ and $n_{NDI}$ is used for determining the least significant bit of the initialization state of the DMRS sequence.

20 Claims, 2 Drawing Sheets

SEQUENCE INITIALIZATION FOR DEMODULATION REFERENCE SIGNAL

RELATED APPLICATIONS

This application claims priority to U.S. Provisional Patent Application No. 61/609,831, entitled "Method of Dynamically Selecting Initialization Parameters for Demodulation Reference Signal," filed Mar. 12, 2012, and to U.S. Provisional Patent Application No. 61/622,418, entitled "Method of Sequence Initialization for Demodulation Reference Signal," filed Apr. 10, 2012, both of which are incorporated by reference in their entirety.

TECHNICAL FIELD

The presented invention relates to wireless communications and, in particular, to a new design of selection of sequence initialization parameters on downlink reference signal for coherent reception of traffic channel in 3GPP Long Term Evolution (LTE) Advanced system, which is one of the candidates for the 4-th generation wireless system.

BACKGROUND

In wireless communication systems, the downlink reference signals are used to provide reference for channel estimation in coherent demodulation as well as reference for channel quality measurement in multi-user scheduling. In the LTE Rel-8 specification, one type of downlink reference format called "cell-specific reference signal" (CRS) is defined for both channel estimation and channel quality measurement. The characteristics of the LTE Rel-8 CRS is that, regardless of the multiple input multiple output (MIMO) channel rank that a mobile station actually needs, the base station always broadcasts the CRS to all the mobile stations based on the largest number of MIMO layers/ports. There is a potential problem with this approach in the development of LTE Rel-10 (also called LTE-advance or LTE-A). Due to the large number of antenna ports (up to 8) supported by LTE-A, the overhead for maintaining the Rel-8 CRS on all ports would be too high.

SUMMARY

A new sequence initialization for demodulation reference signal (DMRS) sequence design used in the LTE-A system is provided. In some implementations, the modulo-2 addition of $n_{SCID}$ and $n_{NDI}$, both of which are provided in a downlink control information (DCI) message, is used to dynamically select one from a plurality of parameter candidates and the dynamically-selected parameter is then used for determining the initialization state of a DMRS sequence. In some other implementations, the modulo-2 addition of $n_{SCID}$ and $n_{NDI}$ is used for determining the least significant bit of the initialization state of the DMRS sequence. In sum, the present application provides a method in dynamic selection of DMRS sequence initialization parameter from multiple candidates, as well as values for those candidates most-likely used in practical implementation.

BRIEF DESCRIPTION OF THE DRAWINGS

Different aspects of the present invention as well as features and advantages thereof will be more clearly understood hereinafter as a result of a detailed description of implementations of the present invention when taken in conjunction with the accompanying drawings, which are not necessarily drawn to scale. Like reference numerals refer to corresponding parts throughout the several views of the drawings.

DESCRIPTION OF EMBODIMENTS

Reference will now be made in detail to implementations, examples of which are illustrated in the accompanying drawings. In the following detailed description, numerous non-limiting specific details are set forth in order to assist in understanding the subject matter presented herein. It will be apparent, however, to one of ordinary skill in the art that various alternatives may be used without departing from the scope of the present invention and the subject matter may be practiced without these specific details.

In the development of LTE Rel-10, it is agreed that the roles of the downlink reference signal should be split into multiple types of reference signal (RS), including:

Demodulation RS (DMRS): this type of RS is used for coherent channel estimation and it should have sufficient density and should be sent on per mobile station basis.

Channel state information RS (CSI-RS): this type of RS is used for channel quality measurement by all mobile stations and it could be sparse in density.

Figure 1:
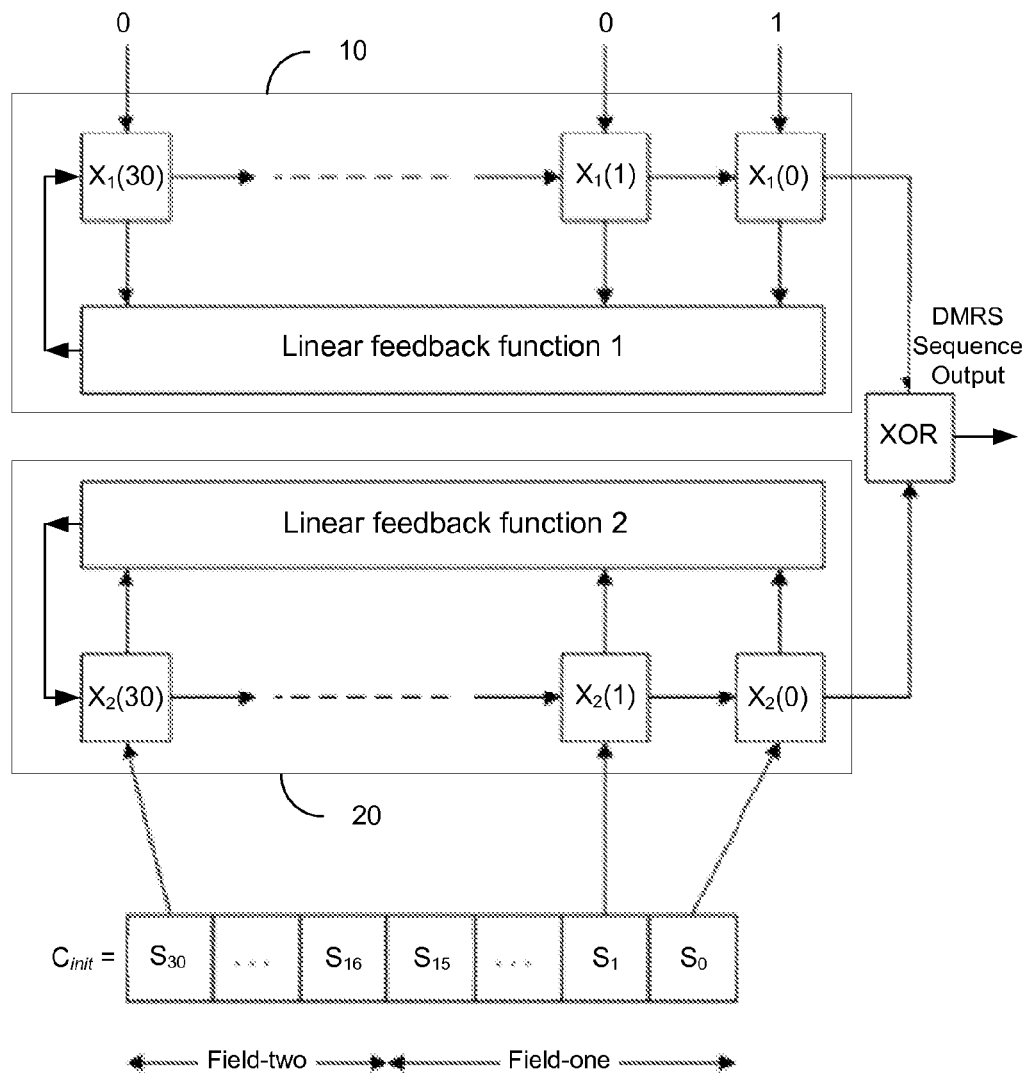
FIG. 1 depicts a DMRS sequence generator and corresponding initialization according to some implementations of the present invention.

In the LTE Rel-10, the DMRS sequence is generated by a length-31 Gold sequence generator, which has two 31-bit linear feedback shift registers 10 and 20 as shown in FIG. 1. The initialization value of one shift register 10 (the upper one in FIG. 1) is fixed. But the initialization value of the other shift register 20 (the lower one in FIG. 1) is configurable by the formula, which can be found in 3GPP TS 36.211 (v10.4.0) at http://www.3gpp.org/ftp/Specs/archive/36_series/36.211/36211-a40.zip (which is incorporated by reference in its entirety):

$$c_{init}=(\lfloor n_s/2 \rfloor+1)\cdot(2N_{ID}^{cell}+1)\cdot 2^{16}+n_{SCID},$$

where $n_s$ is the time slot index at which the DMRS signal is transmitted, and $N_{ID}^{cell}$ is a 9-bit cell identification. $n_{SCID} \in \{0, 1\}$ is a 1-bit parameter dynamically assigned by the system to a mobile station via a 3-bit information field during the dynamic scheduling signaling using a Downlink Control Information (DCI) message (format 2C). An interpretation of the 3-bit information field can be found in 3GPP TS 36.212 (v10.4.0) at http://www.3gpp.org/ftp/Specs/archive/36_series/36.212/36212-a40.zip (which is incorporated by reference in its entirety) and it is provided in Table-1 below.

TABLE 1

3-bit MIMO layer assignment in LTE Rel-10 DCI format 2C

| One Codeword: Codeword 0 enabled, Codeword 1 disabled | | Two Codewords: Codeword 0 enabled, Codeword 1 enabled | |
|---|---|---|---|
| 3-bit Field Value | Message | 3-bit Field Value | Message |
| 0 | 1 layer, port 7, $n_{SCID}=0$ | 0 | 2 layers, ports 7-8, $n_{SCID}=0$ |
| 1 | 1 layer, port 7, $n_{SCID}=1$ | 1 | 2 layers, ports 7-8, $n_{SCID}=1$ |
| 2 | 1 layer, port 8, $n_{SCID}=0$ | 2 | 3 layers, ports 7-9, $n_{SCID}=0$ |
| 3 | 1 layer, port 8, $n_{SCID}=1$ | 3 | 4 layers, ports 7-10, $n_{SCID}=0$ |

TABLE 1-continued 3-bit MIMO layer assignment in LTE Rel-10 DCI format 2C

| One Codeword: Codeword 0 enabled, Codeword 1 disabled | | Two Codewords: Codeword 0 enabled, Codeword 1 enabled | |
| --- | --- | --- | --- |
| 3-bit Field Value | Message | 3-bit Field Value | Message |
| 4 | 2 layers, ports 7-8, $n_{SCID} = 0$ | 4 | 5 layers, ports 7-11, $n_{SCID} = 0$ |
| 5 | 3 layers, ports 7-9, $n_{SCID} = 0$ | 5 | 6 layers, ports 7-12, $n_{SCID} = 0$ |
| 6 | 4 layers, ports 7-10, $n_{SCID} = 0$ | 6 | 7 layers, ports 7-13, $n_{SCID} = 0$ |
| 7 | Reserved | 7 | 8 layers, ports 7-14, $n_{SCID} = 0$ |

Currently, 3GPP is discussing the downlink coordinated multi-point (CoMP) transmission for LTE Rel-11, which requires multiple transmission points (either a base station itself or a remote radio head (RRH)) to coordinate their transmissions to a mobile station (also known as user equipment (UE)). This cooperative transmission has four scenarios:

Scenario 1: Homogeneous network with co-site macro eNBs;

Scenario 2: Homogeneous network with macro eNBs that are not necessarily co-site;

Scenario 3: Heterogeneous network with low power RRHs within a macro cell's coverage where the transmission/reception points created by the low power RRHs have different cell IDs from the macro cell; and Scenario 4: Heterogeneous network with low power RRHs within a macro cell's coverage where the transmission/reception points created by the low power RRHs have the same cell ID as the macro cell.

Note that the terms like "macro eNB" and "macro cell" are used interchangeably in this application. In the downlink CoMP, the transmissions to two UEs can be scheduled on the same time-frequency resource to increase the resource utilization using one of the following multi-user MIMO (MU-MIMO) schemes:

The DMRS for these two UEs are orthogonal. According to Table-1 above, this scheme means that the signals of the two UEs are both single layer transmission, and they are allocated on the DMRS port 7 and port 8, respectively. This scheme further requires the DMRS sequences for these two UEs be initialized using the same $c_{init}$.

The DMRS for these two UEs are quasi-orthogonal. According to Table-1 above, this scheme means that the transmissions of the two UEs can have any allowed number of layers and they are independently allocated on the DMRS ports according to the rules defined in Table-1 above. This scheme requires interference randomization (i.e., the signal of one UE is considered as interference to another UE) and it further requires that the DMRS sequences for these two UEs be initialized using different $c_{init}$.

Therefore, a new DMRS sequence initialization method, which decouples a DMRS sequence from the serving cell's identity, is desired to support the downlink CoMP. One way of achieving is to replace the Rel-10 DMRS sequence initialization formula with the following one according to 3GPP RAN1 TDoc R1-120869 at http://www.3gpp.org/ftp/tsg_ran/wg1_rl1/TSGR1_68/Docs/R1-120869.zip (which is incorporated by reference in its entirety):

$$c_{init} = (\lfloor n_s/2 \rfloor + 1) \cdot (2X+1) \cdot 2^{16} + n_{SCID},$$

where X is a parameter whose value is dynamically chosen from $\{x(0), x(1), \ldots x(N-1)\}$ for $N>1$, and $x(n)$ ($0 \leq n < N$) is configured by the UE-specific RRC signaling semi-statically. The dynamic selection of $x(n)$ by the base station is used to support the dynamic switching between the DMRS orthogonality and the quasi-orthogonally (interference randomization).

In some implementations, according to 3GPP RAN1 TDoc R1-120787 at http://www.3gpp.org/ftp/tsg_ran/wg1_rl1/TSGR1_68/Docs/R1-120787.zip (which is incorporated by reference in its entirety), the dynamic selection of $x(n)$ by the base station is achieved by binding the dynamic selection to the parameter $n_{SCID}$, i.e., $X = x(n_{SCID})$. However, this approach results in a conflict between the design targets on the DMRS orthogonality and interference randomization. DMRS orthogonality requires that the same $n_{SCID}$ map to the same X so that $c_{init}$ is the same. On the other hand, interference randomization requires that the same $n_{SCID}$ NOT map to the same X so that $c_{init}$ can be different. Although this issue may not appear between two UEs served by either a single or two transmission points (TPs), it occurs when the number of UEs to be considered in the inter-UE DMRS orthogonality relation is larger than N. As shown in FIG. 2A, UE1 and UE2 are served by two RRHs, RRH #1 and RRH#2, respectively. UE3 is served by the macro eNB. The CoMP transmission among these three UEs is such that at a given transmission time interval (TTI), any two of the three UEs may have their respective single-TP transmission paired as inter-TP MU-MIMO transmission, where one TP refers to either macro eNB or RRH. For example, at the TTI instance time $t_1$, UE1 and UE2 are paired together as inter-TP MU-MIMO transmission; at the TTI instance time $t_2$, UE1 and UE3 are paired together; and at the TTI instance time $t_3$, UE2 and UE3 are paired together. Note that, the TTI instances $\{t_1, t_2, t_3\}$ can occur shortly away from each other and within one period of semi-static configuration of candidate values $\{x(0), x(1), \ldots x(N-1)\}$.

Figure 2B:
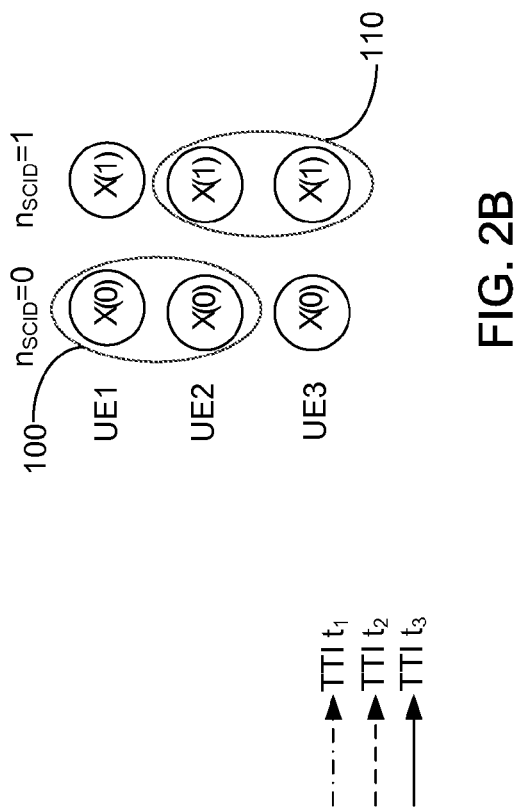
FIGS. 2A and 2B depict a CoMP transmission example based on $n_{SCID}$-only dynamic selection.
Figure 2A:
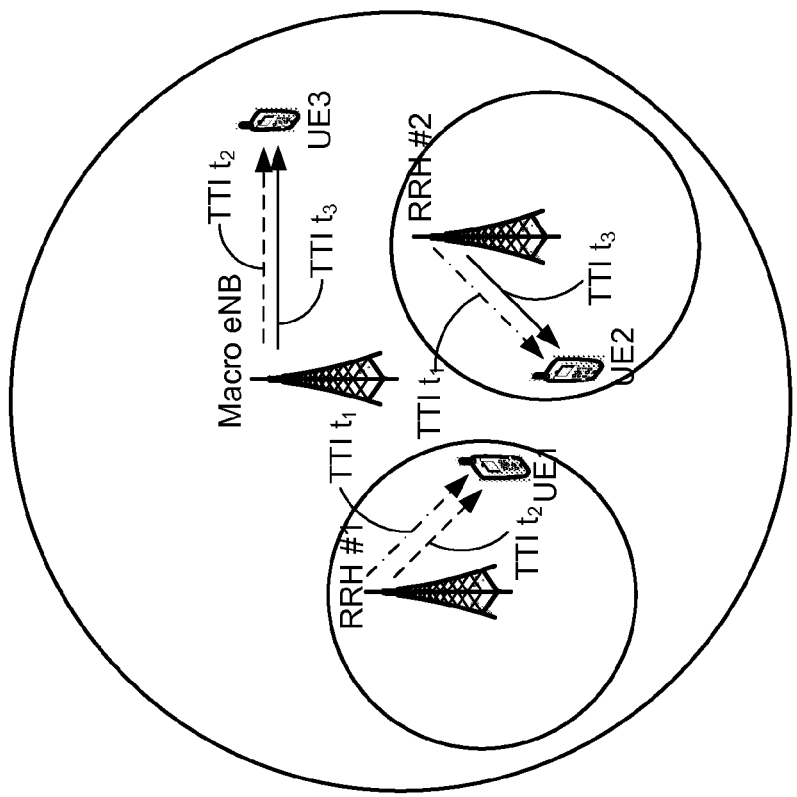

As shown in FIG. 2B, because the DMRS orthogonality requires the same $n_{SCID}$ and the same X, the configured $x(n)$ choices that support the orthogonal DMRS are circled in an array of three rows by two columns. Note that each of the two circles 100 and 110 is placed in the same column, instead of crossing two columns, because the same column has the same $n_{SCID}$. It can be seen that, after the DMRS orthogonality is achieved between UE1 UE2 as well as between UE2 and UE3, the only way to achieve the DMRS orthogonality between UE1 and UE3 is to have the same $x(0)$ or $x(1)$ for all three UEs. But this configuration is not a good setup configured by RRC, and it sometimes can even result in a worse RRC configuration when combined with other design targets and requirements.

In some implementations, the three design targets on the DMRS orthogonality and interference randomization are:

Each UE should support a single-TP PDSCH of more than two layers of MIMO transmission, which requires that $n_{SCID}=0$ and $x(n_{SCID}=0)$ be different between two RRHs as well as between an RRH and a macro eNB for the purpose of interference randomization. This criterion determines the column marked with "$n_{SCID}=0$" in Table-2.

An UE served by an RRH and a Rel-10 UE served by a macro eNB should be paired with orthogonal DMRS. This criterion determines the entries for UE1 and UE2 under the column marked with "$n_{SCID}=1$" in Table-2.

The operation shown in FIGS. 2A and 2B, as analyzed earlier in this paragraph, requires the same $x(0)$ or $x(1)$ among different UEs, which further requires that x($n_{SCID}$=1) of all three UEs be equal to $N_{ID}^{cell}$ of the macro UE, in the column marked with "$n_{SCID}$=1" in Table-2.

The seed assignment based on the above three criteria is that: the macro UE (UE3) has effectively no dynamic selection on seed X because all the candidates for selection are the same. In addition, because both x(0) and x(1) for UE3 are cell-specific values for the macro cell, they are not equal to any x(0) or x(1) of a UE in a neighboring macro cell if the seed assignment in the neighboring macro cell follows the same strategy shown in Table-2 below. If so, it is impossible to realize the DMRS orthogonality between two UEs that are locate in two neighboring macro-cells, respectively. Therefore, dynamic selection based on $n_{SCID}$ alone is not a good choice.

TABLE 2

Example of x(n) assignment for FIG. 2B

| | $n_{SCID}$ = 0 | $n_{SCID}$ = 1 |
|---|---|---|
| UE-1 | $N_{TPID}^{RRH-1}$ | $N_{ID}^{cell}$ of macro |
| UE-2 | $N_{TPID}^{RRH-2}$ | $N_{ID}^{cell}$ of macro |
| UE-3 | $N_{ID}^{cell}$ of macro cell | $N_{ID}^{cell}$ of macro cell |

In some implementations, the present application is directed to a method of investigating the dynamic selection for DMRS sequence initialization parameters based on another 1-bit information field in the DCI (format 2C), which is called "New Data Indictor" (NDI), or based on a combination of $n_{SCID}$ and NDI. The method breaks the one-to-one mapping relationship between the least significant bit of $c_{init}$ and the index of x(n). Multiple implementations of the DMRS sequence initialization parameter designs are described in more detail below.

If $n_{SCID}$ in Table-1 is considered as a single indicator for dynamic selection, the circles on the candidate values shown in FIG. 2B should be placed on a per column basis. One way to achieve this goal is one of the following two choices, both of which require the decoupling of $n_{SCID}$ in $c_{init}$ from $n_{SCID}$ in DCI:

Choice-1: set $n_{SCID}$ in $c_{init}$ to a fixed value (e.g., zero) when $n_{SCID}$ in DCI is used for dynamic selection of x(n). That is, $c_{init}=(\lfloor n_s/2 \rfloor+1)\cdot(2X+1)\cdot 2^{16}$ for X=x($n_{SCID}$) for $$N = 2$$

and $$n_{SCID} = \begin{cases} n_{SCID} \text{ bit in } DCI - 2C & M \text{ codeword and } M \text{ layer,} \\ & M = \{1, 2\} \\ 0 & \text{otherwise.} \end{cases}$$

Choice-2: set $n_{SCID}$ in $c_{init}$ to be a complement of $n_{SCID}$ in the DCI message for either macro-UE (e.g., UE3 in FIG. 2A) or RRH-UE (e.g., UE1 and UE2 in FIG. 2A). That is, $c_{init}=(\lfloor n_s/2 \rfloor+1)\cdot(2X+1)\cdot 2^{16}+[(n_{SCID}+n_{UE}) \mod 2]$ where $n_{UE} \in \{0,1\}$ is the UE-specific parameter configured by RRC signaling, X=x($n_{SCID}$) for N=2 and $$n_{SCID} = \begin{cases} n_{SCID} \text{ bit in } DCI - 2C & M \text{ codeword and } M \text{ layer,} \\ & M = \{1, 2\} \\ 0 & \text{otherwise.} \end{cases}$$

LTE Rel-10 DCI (format 2C) supports the scheduling of up to two codewords in a single PDSCH transmission as shown in Table-1. Each codeword has independent HARQ feedback because it is very likely for one codeword to succeed but another codeword to fail. In this case, DCI (format 2C) provides one New Data Indicator (NDI) bit for each codeword to indicate whether the corresponding scheduled codeword is the initial transmission or re-transmission in the HARQ process. When the DCI (format 2C) schedules just one codeword, the second NDI bit is transmitted According to Table-1, when two codewords are scheduled by the DCI (format 2C), the minimum number of layers of MIMO transmission is 2, which leaves the quasi-orthogonal DMRS as the only possibility. Therefore, it is not necessary to support dynamic selection between orthogonal DMRS and quasi-orthogonal DMRS when the second NDI bit is not reserved. On the other hand, for a single-layer transmission that needs dynamic selection, one reserved NDI bit in the DCI (format 2C) is available to be re-defined as a dynamic selection indicator, i.e., $$c_{init}=(\lfloor n_s/2 \rfloor+1)\cdot(2X+1)\cdot 2^{16}+n_{SCID},$$

where X=x($n_{NDI}$) for N=2 and $$n_{NDI} = \begin{cases} NDI \text{ bit for } codeword1 \text{ in } DCI - 2C & \text{one } codeword \\ 0 & \text{two } codewords. \end{cases}$$

In some implementations, it is possible to combine $n_{SCID}$ and $n_{NDI}$ with the given number of codeword(s) and the number of transmission layers, to provide four candidates for dynamic selection. That is, $$c_{init} = (\lfloor n_s/2 \rfloor + 1) \cdot (2X + 1) \cdot 2^{16} + n_{SCID}$$

where $$X = x(2 \cdot n_{NDI} + n_{SCID})$$

or $$X = x(2 \cdot n_{SCID} + n_{NDI}),$$

and $$n_{NDI} = \begin{cases} NDI \text{ bit for } codeword1 \text{ in } DCI - 2C & \text{one } codeword \\ & \text{and} \\ 0 & \text{two } codewords. \end{cases}$$

$$n_{SCID} = \begin{cases} n_{SCID} \text{ bit in } DCI - 2C & M \text{ codeword and } M \text{ layer,} \\ & M = \{1, 2\} \\ 0 & \text{otherwise.} \end{cases}$$

In some implementations, because $n_{SCID}$ and $n_{NDI}$ have different conditions under which their dynamic selection functions are active, these conditions are unified by restricting the dynamic selection to a single-layer transmission only. That is $$c_{init} = (\lfloor n_s/2 \rfloor + 1) \cdot (2X + 1) \cdot 2^{16} + n_{SCID}$$

where $$X = x(2 \cdot n_{NDI} + n_{SCID})$$

or

-continued $$X = x(2 \cdot n_{SCID} + n_{NDI}).$$

$$n_{NDI} = \begin{cases} NDI \text{ bit for } codeword1 \text{ in } DCI-2C & \text{single layer} \\ 0 & \text{and} \\ & \text{otherwise} \end{cases}$$

$$n_{SCID} = \begin{cases} n_{SCID} \text{ bit in } DCI-2C & \text{single layer} \\ 0 & \text{otherwise.} \end{cases}$$

Note that although the formula $c_{init}=(\lfloor n_s/2 \rfloor+1) \cdot (2X+1) \cdot 2^{16}+n_{SCID}$ is used in the above description for dynamic selection based on a combination of $n_{NDI}$ and $n_{SCID}$, $c_{init}=(\lfloor n_s/2 \rfloor+1) \cdot (2X+1) \cdot 2^{16}+[(n_{SCID}+n_{UE}) \bmod 2]$ is also applicable.

In the present application, $\{x_p(n)\}$ represents the candidates for dynamic selection for the UE served by an RRH (also referred to as "pico cell" herein), and $\{x_m(n)\}$ represents the candidates for dynamic selection for the UE served by a macro eNB. The following design criteria in the value assignment are proposed:

1) Interference Randomization Among Transmission Points

At any time, the UE should have the capability of being scheduled with a single-TP PDSCH transmission of more than two layers. When this happens, the corresponding X in $c_{init}$ should be different from any X that is used by other TPs to schedule transmissions of more than two layers, for the purpose of interference randomization. Meanwhile, it is $n_{NDI}=0$ for $X=x(n_{NDI})$, and $<n_{NDI}=0, n_{SCID}=0>$ for $X=x(2 \cdot n_{NDI}+n_{SCID})$ or $X=x(2 \cdot n_{SCID}+n_{NDI})$ that support PDSCH of more than two layers. Therefore, there should be one $x(n)$ candidate, $x(n_0)$, which is different from $x(n_0)$ of other TPs in the neighboring area, where $n_0$ allows PDSCH transmission of more than two layers. That is, $x_{p1}(n_0) \neq x_{p2}(n_0)$ for two neighboring RRHs and $x_p(n_0) \neq x_m(n_0)$ for an RRH and a macro eNB. For the dynamic selection indicator proposed in the present application, $n_0=0$.

2) DMRS Orthogonality Between a Rel-11 UE Served by an RRH and a UE Served by a Macro eNB In order to support orthogonal MU-pairing between the UE served by the RRH and the UE served by the macro eNB, it is necessary to assign the same X and the same $n_{SCID}$ to the two UEs, i.e., $x_p(n_i)=x_m(n_j)$ where $n_i$ and $n_j$ allow the same $n_{SCID}$.

3) DMRS Orthogonality Between Rel-11 UEs Served by Two RRHs

In order to support orthogonal MU-pairing between UEs served by two neighboring RRHs, it is necessary to assign the same X and the same $n_{SCID}$ to the UEs, i.e., $x_{p1}(n_i)=x_{p2}(n_j)$ where $n_i$ and $n_j$ allow the same $n_{SCID}$.

4) DMRS Orthogonality Between a Rel-11 UE and a Rel-10 UE

In order to support orthogonal MU-pairing between the Rel-11 UE and the Rel-10 UE served by the same TP, the legacy physical cell ID ($ND_{ID}^{cell}$) of that TP should be assigned to one of $x(n)$ for the Rel-11 UE. On the other hand, in order to support orthogonal MU-pairing between a Rel-11 UE served by a RRH and a Rel-10 UE served by a macro eNB, it is also necessary for the UE served by the RRH to have $x_p(n_k)=N_{ID}^{macrocell}$ for some $n_k$, where $N_{ID}^{macrocell}$ denotes the physical cell-ID ($N_{ID}^{cell}$) of the macrocell.

When working together, the above criteria result in the following $x(n)$ assignments in a heterogeneous network (HetNet):

If $X=x(n_{NDI})$ or $X=x(n_{SCID})$ is adopted, the $x(n)$ assignment is given by Table-3 below.

TABLE 3 x(n) value assignment based on $n_{NDI}$ or $n_{SCID}$ in HetNet

| | CoMP Scenario-3 | | CoMP Scenario-4 | |
|---|---|---|---|---|
| | $n_{NDI}=0$ $n_{SCID}=0$ | $n_{NDI}=1$ $n_{SCID}=1$ | $n_{NDI}=0$ $n_{SCID}=0$ | $n_{NDI}=1$ $n_{SCID}=1$ |
| UE in RHH | $N_{ID}^{cell}$ of RRH | $N_{ID}^{cell}$ of macro cell | TP-ID of RRH | $N_{ID}^{cell}$ of macro cell |
| UE in macro eNB | $N_{ID}^{cell}$ of macro cell | $N_{ID-1}^{celledge}$ of macro cell | $N_{ID}^{cell}$ of macro cell | $N_{ID-1}^{celledge}$ of macro cell |

If $X=x(2 \cdot n_{NDI}+n_{SCID})$ or $X=x(2 \cdot n_{SCID}+n_{NDI})$ is adopted, the $x(n)$ assignment is given by Table-4 below.

TABLE 4 x(n) value assignment based on a combination of $n_{NDI}$ and $n_{SCID}$ in HetNet. If X = x(nNDI) or X = x(nSCID) is adopted, the x(n) assignment is given by Table-3 below.

| | CoMP Scenario-3 | | | | CoMP Scenario-4 | | | |
|---|---|---|---|---|---|---|---|---|
| | $n_{SCID}=0$ $n_{NDI}=0$ | $n_{SCID}=0$ $n_{NDI}=1$ | $n_{SCID}=1$ $n_{NDI}=0$ | $n_{SCID}=1$ $n_{NDI}=1$ | $n_{SCID}=0$ $n_{NDI}=0$ | $n_{SCID}=0$ $n_{NDI}=1$ | $n_{SCID}=1$ $n_{NDI}=0$ | $n_{SCID}=1$ $n_{NDI}=1$ |
| UE in RRH | $N_{ID}^{cell}$ of RRH | $N_{ID}^{cell}$ of macro cell | $N_{ID-2}^{cell}$ of macro cell | $N_{ID}^{neighborig}$ of RRH | TP-ID of RRH | $N_{ID}^{cell}$ of macro cell | $N_{ID-2}^{cell}$ of macro cell | $N_{ID}^{neighborig}$ of RRH |
| UE in macro cell | $N_{ID}^{cell}$ of macro cell | $N_{ID-1}^{celledge}$ of macro cell | $N_{ID-2}^{cell}$ of macro cell | $N_{ID-2}^{celledge}$ of macro cell | $N_{ID}^{cell}$ of macro cell | $N_{ID-1}^{celledge}$ of macro cell | $N_{ID-2}^{cell}$ of macro cell | $N_{ID-2}^{celledge}$ of macro cell |

| | CoMP Scenario-3 | | CoMP Scenario-4 | |
|---|---|---|---|---|
| | nNDI = 0 nSCID = 0 | nNDI = 1 nSCID = 1 | nNDI = 0 nSCID = 0 | nNDI = 1 nSCID = 1 |
| UE in RRH | $N_{ID}^{cell}$ of RRH | $N_{ID}^{cell}$ of macro cell | TP-ID of RRH | $N_{ID}^{cell}$ of macro cell |
| UE in | $N_{ID}^{cell}$ of | $N_{ID-1}^{celledge}$ of | $N_{ID}^{cell}$ of macro | $N_{ID-1}^{celledge}$ of |

-continued

|  | CoMP Scenario-3 | | CoMP Scenario-4 | |
| --- | --- | --- | --- | --- |
|  | nNDI = 0<br>nSCID = 0 | nNDI = 1<br>nSCID = 1 | nNDI = 0<br>nSCID = 0 | nNDI = 1<br>nSCID = 1 |
| macro<br>eNB | macro cell | macro cell | cell | macro cell |

Table-3 and Table-4 depict, respectively, that the assignment of $N_{ID}^{cell}$ (or TP-ID) of the RRH and $N_{ID}^{cell}$ of macro cell are determined by the criteria described above. In addition, the following assignments are made:

$N_{ID\text{-}1}^{celledge}$ of macro cell: a primary X assigned to UEs to support orthogonal MU-pairing between two macro cell.

$N_{ID\text{-}2}^{celledge}$ of macro cell: a secondary X assigned to UEs to support orthogonal MU-pairing between two macro cells.

$N_{ID\text{-}2}^{cell}$ of macro cell: a secondary TP-ID (with $N_{ID}^{cell}$ being the primary) in a macro cell. It also functions as a common X used by RRHs in the corresponding macro cell.

$N_{ID\text{-}2}^{cell}$ of RRH: a secondary TP-ID (with $N_{ID}^{cell}$ or TP-ID being the primary) in RRH.

$N_{ID}^{neighboring}$ of RRH: a common X used by multiple RRHs in the neighboring area.

In Table-4, the columns corresponding to $<n_{SCID}=0, n_{NDI}=0>$ have the same assignments as the columns corresponding to $n_{NDI}=0$ in Table-3. Similarly, the columns corresponding to $<n_{SCID}=0, n_{NDI}=1>$ in Table-4 have the same assignments as the column corresponding to $n_{NDI}=1$ in Table-3. When determining the assignments in columns corresponding to $<n_{SCID}=1, n_{NDI}=0>$ in Table-4, $N_{ID\text{-}2}^{cell}$ of a macro cell can be used to configure one macro-UE's DMRS to be quasi-orthogonal to the DMRS of another macro-UE whose DMRS sequence is initialized by $N_{ID}^{cell}$ of the same macro cell. According to the interference randomization criteria, the supported number of transmission layers should be as large as possible. Because $<n_{SCID}=1, n_{NDI}=0>$ supports two-layer in HARQ initial transmission in Table-1, which is the second largest number of layers after $<n_{SCID}=0, n_{NDI}=0>$ and is already reserved for $N_{ID}^{cell}$, $N_{ID\text{-}2}^{cell}$ should be assigned to $<n_{SCID}=1, n_{NDI}=0>$ in Table-4. The same principle is applicable to the assignment of $N_{ID\text{-}2}^{cell}$ of RRH.

Note that $<n_{SCID}=1, n_{NDI}=1>$ is the remaining entry in Table-4 that has not been assigned a value for a UE served by an RRH. There are two candidates for this entry:

the common $N_{ID}^{neighboring}$ used by RRHs in the neighboring area, which is used to support orthogonal MU-pairing between neighboring TPs, and provide interference randomization in area splitting—because different neighboring areas in the same macro cell have different $N_{ID}^{neighboring}$ and therefore can have their transmissions in parallel.

$N_{ID\text{-}2}^{cell}$ of macro cell, which is used by RRHs in the macro cell to support the orthogonal MU-pairing between RRHs as well as between an RRH and a macro cell without consuming the primary unique ID ($N_{ID}^{cell}$) of the macro cell.

$N_{ID}^{cell}$ can take any value between 0 and 503 in the LTE Rel-10. To prevent $c_{init}$ from overflowing to more than 31 bits, the value of x(n) should be no more than 1637. With the introduction of UE-specific RRC configuration on X with multiple candidate values, the number of different values on the DMRS sequence seed required in the given coverage area is more than what is available in the LTE Rel-10, thus the chance of sequence seed collision may increase. Increasing the value range of x(n) can alleviate this problem. In addition, it provides a way to apply new values of x(n) onto the existing network to double or even to triple the LTE Rel-10 sequence seed capacity. So the value range of x(n) herein is defined to be [0, 1637].

If there are only two seed candidates, x(0) and x(1), in the dynamic selection, another solution is provided below:

Choice-1: Both $n_{SCID}$ and another 1-bit parameter derived from DCI, $n_{NDI}$, are combined in the form of modulo-2 addition to indicate dynamic selection of X. That is, $c_{init}=(\lfloor n_s/2 \rfloor+1)\cdot(2X+1)\cdot2^{16}+n_{SCID}$ for $X=x((n_{SCID}+n_{NDI}) \bmod 2)$. Note that $n_{NDI}$ is derived from either a reserved NDI bit in the DCI or another existing or newly-introduced bit in the DCI; or Choice-2: Both $n_{SCID}$ and another 1-bit parameter derived from DCI, $n_{NDI}$, are combined in the form of modulo-2 addition to replace $n_{SCID}$ in the least significant bit of $c_{init}$. That is, $c_{init}=(\lfloor n_s/2 \rfloor+1)\cdot(2X+1)\cdot2^{16}+[(n_{SCID}+n_{NDI}) \bmod 2]$ for $X=x(n_{SCID})$. Note that $n_{NDI}$ is derived from either a reserved NDI bit in the DCI or another existing or newly-introduced bit in the DCI. This is similar to $c_{init}=(\lfloor n_s/2 \rfloor+1)\cdot(2X+1)\cdot2^{16}+[(n_{SCID}+n_{UE}) \bmod 2]$ described above.

In both choices, $$n_{SCID} = \begin{cases} n_{SCID} \text{ bit in DCI} & DCI-2B \text{ or} \\ & DCI-2C \text{ of rank} \in \{1, 2\} \\ 0 & DCI-2C \text{ of rank} > 2. \end{cases}$$

If $n_{NDI}$ is derived from a reserved NDI bit in the DCI, $$n_{NDI} = \begin{cases} NDI \text{ bit for} & DCI-2C \text{ scheduling one codeword} \\ codeword1 \text{ in DCI} & \\ 0 & DCI-2B \text{ or } DCI-2C \\ & scheduling two codeword \end{cases}$$

Note that each of the two choices described above can be performed by a base station or a UE (e.g., a mobile station). In some implementations, the above-described methods and their variations may be implemented as computer software instructions or firmware instructions. Such instructions may be stored in an article with one or more machine-readable storage devices connected to one or more computers or integrated circuits or digital processors such as digital signal processors and microprocessors. In a communication system, the DMRS sequence initialization methods and related signaling flow and process may be implemented in form of software instructions or firmware instructions for execution by a processor in the transmitter and receiver or the transmission and reception controller. In operation, the instructions are executed by one or more processors to cause the transmitter and receiver or the transmission and reception controller to perform the described functions and operations. Other variations and enhancements are possible based on what is mentioned here.

While particular implementations are described above, it will be understood it is not intended to limit the invention to these particular implementations. On the contrary, the invention includes alternatives, modifications and equivalents that are within the spirit and scope of the appended claims. Numerous specific details are set forth in order to provide a thorough understanding of the subject matter presented herein. For example, the dual-band backhaul radio design can be extended to other NLOS and LOS frequency combinations, e.g., 2.4 GHz or 2.6 GHz in the NLOS bands combined with E-band in the LOS bands. Moreover, the dual-band design can be further extended to a triple-band design, i.e., selective switching bands in NLOS in combination with either 60 GHz or E-band in LOS bands. But it will be apparent to one of ordinary skill in the art that the subject matter may be practiced without these specific details. In other instances, well-known methods, procedures, components, and circuits have not been described in detail so as not to unnecessarily obscure aspects of the implementations.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

I claim:

1. A method of dynamically selecting one parameter X from multiple candidates $\{x(0), x(1), \ldots x(N-1)\}$ to initialize a linear feedback shift register for generating a downlink demodulation reference signal (DMRS) sequence, wherein the linear feedback shift register has an initialization state that is a function of X and $n_{SCID}$, wherein the method is performed by a system having one or more processors and:

the parameter X is dynamically selected from multiple candidate values based on an NDI bit in a DCI message, $n_{SCID}$ information provided by the DCI message, or a combination of the NDI bit and the $n_{SCID}$ information provided by DCI message; and specific values are assigned to the multiple candidates $\{x(0), x(1), \ldots x(N-1)\}$.

2. The method recited in claim 1, wherein $X=x(n_{NDI})$ for N=2 and $$n_{NDI} = \begin{cases} NDI \text{ bit for } codeword1 \text{ in } DCI - 2C & \text{one } codeword \\ 0 & \text{two } codewords \end{cases}$$

3. The method recited in claim 1, wherein $X=x(2 \cdot n_{NDI} + n_{SCID})$ or $$X = x(2 \cdot n_{SCID} + n_{NDI}) \text{ for } N = 4,$$

and $$n_{NDI} = \begin{cases} NDI \text{ bit for } codeword1 \text{ in } DCI - 2C & \text{one } codeword \\ 0 & \text{two } codewords \end{cases}$$

$$n_{SCID} = \begin{cases} n_{SCID} \text{ bit in } DCI & M \text{ } codeword \text{ and } M \text{ layer,} \\ \text{format } 2C & M = \{1, 2\} \\ 0 & \text{otherwise} \end{cases}$$

4. The method recited in claim 3, wherein one specific x(n) candidate, whose index n corresponds to $n_{NDI}=0$ and $n_{SCID}=1$ such that it is represented equivalently by $x(n_{NDI}=0, n_{SCID}=1)$, is assigned with a unique value on a TP-basis in the neighboring area such that different TPs in the neighboring area have different $x(n_{NDI}=0, n_{SCID}=1)$; and $x(n_{NDI}=0, n_{SCID}=1)$ is not equal to $x(n_{NDI}=0, n_{SCID}=0)$ for the same TP.

5. The method recited in claim 1, wherein $$X = x(n_{SCID}) \text{ for } N = 2$$

and $$n_{SCID} = \begin{cases} n_{SCID} \text{ bit in } DCI \text{ message} & M \text{ codeword and } M \text{ layer,} \\ & M = \{1, 2\} \\ 0 & \text{otherwise,} \end{cases}$$

and $n_{SCID}$ in the equation $c_{init}=(\lfloor n_s/2 \rfloor+1)\cdot(2X+1)\cdot2^{16}+n_{SCID}$ is set to zero.

6. The method recited in claim 1, wherein one specific $x(n)$ candidate, $x(n_0)$, where $n_0$ is derived from the parameters allowing PDSCH transmission of up to eight layers or more than two layers, is assigned with a unique value on a TP-basis in the neighboring area, that is, different TPs in the neighboring area have different $x(n_0)$.

7. The method recited in claim 6, wherein $n_0$ corresponds to $n_{NDI}=0$.

8. The method recited in claim 6, wherein $n_0$ corresponds to $n_{NDI}=0$ and $n_{SCID}=0$.

9. The method recited in claim 6, wherein $n_0$ corresponds to $n_{SCID}=0$.

10. The method recited in claim 6, wherein the unique value is physical cell identification ($N_{ID}^{cell}$) of the transmission TP if the transmission TP is the macro eNB or the RRH in CoMP scenario-3.

11. The method recited in claim 6, wherein the unique value is some number other than physical cell identification ($N_{ID}^{cell}$) of the transmission TP if the transmission TP is the RRH in CoMP scenario-4.

12. The method recited in claim 1, wherein one specific $x(n)$ candidate, $x(n_1)$, where $n_1 \neq n_0$ ($n_0$ is given by claim 6) and $n_1$ is derived from the parameters that do not prevent $n_{SCID}$ in $c_{init}$ from being 0, is assigned with physical cell identification ($N_{ID}^{cell}$) of the macro TP, if the transmission TP is the RRH and can transmit to UE in cooperation with macro TP.

13. The method recited in claim 12, wherein $n_1$ corresponds to $n_{NDI}=1$.

14. The method recited in claim 12, wherein $n_1$ corresponds to $n_{NDI}=1$ and $n_{SCID}=0$.

15. The method recited in claim 12, wherein $n_1$ corresponds to $n_{SCID}=1$.

16. The method recited in claim 1, wherein the value range of each $x(n)$ is between 0 and 1637 inclusively.

17. The method recited in claim 1, wherein the initialization state that is a function of X and $n_{SCID}$ is given by $c_{init}=(\lfloor n_s/2 \rfloor+1)\cdot(2X+1)\cdot2^{16}+[(n_{SCID}+n_{UE})\text{mod } 2]$; and $n_{UE} \in \{0,1\}$ is either the UE-specific parameter configured by RRC signaling, or equal to NDI bit derived from DCI message.

18. The method recited in claim 1, wherein the initialization state that is a function of X and $n_{SCID}$ is given by $c_{init}=(\lfloor n_s/2 \rfloor+1)\cdot(2X+1)\cdot2^{16}+n_{SCID}$.

19. The method recited in claim 1, wherein the system is a base station.

20. The method recited in claim 1, wherein the system is a user equipment.

* * * * *